UNITED STATES PATENT OFFICE.

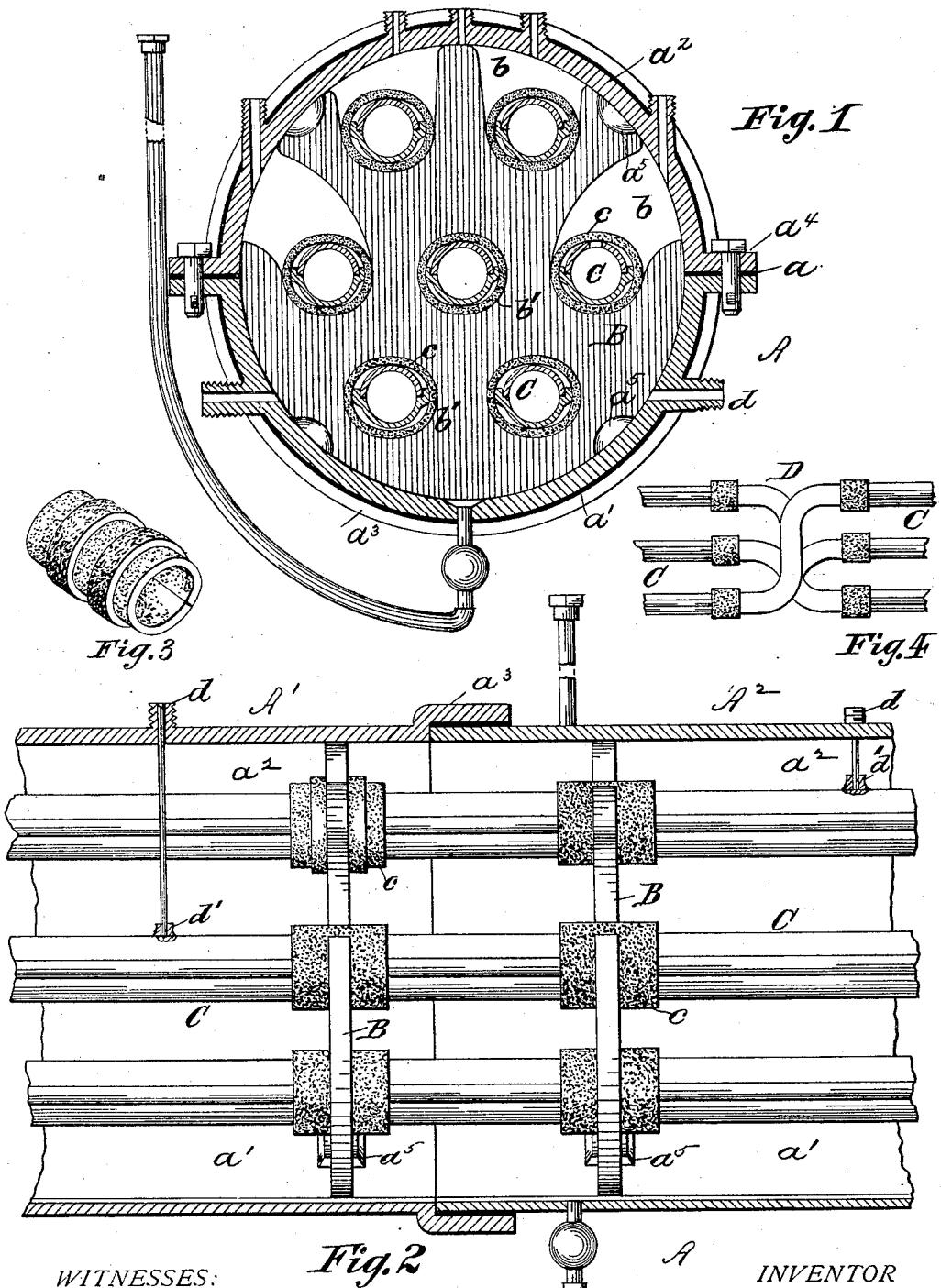

SAMUEL D. STROHM, OF PHILADELPHIA, PENNSYLVANIA, ASSIGNOR OF ONE-THIRD TO HARRISON SNYDER, OF SAME PLACE.

SUBTERRANEAN CONDUIT FOR ELECTRICAL CONDUCTORS.

SPECIFICATION forming part of Letters Patent No. 247,432, dated September 20, 1881.

Application filed May 25, 1881. (No model.)

*To all whom it may concern:*

Be it known that I, SAMUEL D. STROHM, a citizen of the United States, residing at Philadelphia, in the county of Philadelphia and State of Pennsylvania, have invented certain new and useful Improvements in Subterranean Conduits for Electrical Conductors; and I do hereby declare the following to be a full, clear, and exact description of the invention, reference being had to the accompanying drawings, which form part of this specification, in which—

Figure 1 is a transverse vertical section of my invention. Fig. 2 is a longitudinal vertical section, and Figs. 3 and 4 are detail views.

My invention has relation to underground conductors for electricity; and it consists in the construction and combinations of parts hereinafter described and claimed.

Referring to the accompanying drawings, A represents the main casing, consisting of pipes $A'$ $A^2$, made of any suitable material, such as metal, clay, glass, or terra-cotta. These pipes are longitudinally divided on the line $a$, forming two sections—one a sub-section, $a'$, and the other or upper half a removable cap, $a^2$. The pipes are jointed end to end by socket-couplings $a^3$, their upper and lower sections being flanged, bolted together, as shown at $a^4$. Each section is formed with internal lugs, $a^5$, or with equivalent annular grooves for the reception and support of diaphragms B, which rest therein, as shown. These diaphragms are disks of any suitable material, whose edges or peripheries conform substantially to the shape of the casing. They are formed with radial or tangential notches $b$ $b$ in or above their middle diameter, and with openings $b'$ $b'$ on such diameter and below the same. These notches and openings are designed for the reception of the internal conduits shown at C C. The wires which proceed through such conduits may pass partly through such of the latter as rest in the notches $b$ $b$ and partly through those in the openings $b'$ $b'$, being led from one to the other by curved or bent connections, as shown at D. The object of this is to pass the wires or conductors through the upper conduits (or those in the notches) at those places in their circuits where they are likely to be led out into or by way of branches, while at other places in their circuits they pass through the lower conduits or those in the openings $b'$.

The conduits C consist of pipes or tubes of glass, vitrified material, or other non-conductor of electricity, and are coupled end to end, and are longitudinally divided, so as to make sub-sections with removable caps like the external casing, A. They rest or are supported on the diaphragms B. To afford them a soft bearing thereon said conduits are provided with encircling rings or collars $c$ $c$ of an elastic nature, such as rubber, cork, or felt. These rings may be placed over the joints, and thus prevent the intrusion thereto or accumulation thereat of moisture. Such joints may coincide in line or annularly with the diaphragms B, or they may be located at points between said diaphragms.

The conduits C, as already stated, are made of non-conducting material, and are therefore insulators; but such insulators, particularly glass, are, if uncoated, liable to accumulate moisture, which condenses on them. As moisture is a conductor of electricity, if permitted to accumulate, it destroys the insulating effect or protective character of the conduits. To guard against this I coat the conduits both inside and outside with shellac or equivalent material, which is an insulator and not a collector of moisture.

I am aware that shellac and other like materials have been used to insulate conductors; but this is not the purpose of my invention, as my object is to render an insulator non-liable to the collection of moisture, so as to preserve its insulating and protective character and functions.

The invention herein described is primarily intended for underground cables and conductors; but it may be employed for submarine purposes, or in cases where the conductors are carried upon poles, walls, or other supports or structures. Where laid underground access may be had through man-holes or vaults in line with the casing, or through which the latter passes, or by means of cellars or other subterraneous passages lateral or adjacent to the line of the conductors. The casing and internal conduits may be first laid and the conductors, which pass through the latter, subsequently introduced. To effect such introduction cord, wire, or other equivalent means of securing draft may be placed in each internal conduit when the latter are being laid. The conducting wires or cables, when it is desired to introduce them, may be attached to the end of such draft cord or wire and then drawn through the conduit.

To permit the conductors to be led out at points or places where needed the casing and conduits are formed with branches, openings, or stems $d\ d'$.

The method of laying conductors according to my invention is as follows: A trench being dug, the lower section of the casing is first laid therein. The diaphragms are then inserted, and the upper section or removable cap placed on the lower or sub section and bolted thereto. The internal conduits are then inserted in the notches and openings in said diaphragms, the elastic bearings being applied to said conduits previously or in the act of their insertion in the diaphragms. After the casing and conduits have been laid the conductors may be passed or drawn through the latter in the manner already described. In some cases cables, of which the conductors form an integral part, may be substituted for the internal conduits, such cables resting in the notches and openings in the diaphragms within the casing A.

When access is needed to the conductors for repairing, branching, or other purposes, it may be had by removing the caps of the casing, and, if need be, of the internal conduits. Under some circumstances the internal conduits need not be longitudinally divided, as already suggested, but may be complete cylinders or tubes.

The casing and conduits should be formed when laid with perfectly-tight joints, so that the air may be exhausted therefrom or from the conduits alone, and a vacuum (as nearly as may be) created and maintained therein, as there is less tendency to leakage of the electricity, and a freer chance for it to travel on the conductors in a vacuum or rarefied atmosphere than under ordinary atmospheric pressure. As the production of a vacuum reduces the moisture otherwise present in the casing or conduits, the tendency of the electrical currents to be carried off the conductors by such moisture is correspondingly diminished.

While I recommend the vacuum or exhaust as desirable, I do not limit the application of the other features of my invention thereto.

The exhaust may be secured by a pump or pumps, or any equivalent suction devices connected with the conduits, and with the casing, if desired, in any suitable manner, and which it is not necessary to specifically describe or illustrate.

By reason of the pipes being made in sections and divisible longitudinally, a broken or imperfect pipe may be removed and a new one substituted therefor without disturbing the others or removing the cables or conductors inside of the same.

What I claim as my invention is as follows:

1. The combination of external casing, A, formed in longitudinal sections, having internal lugs, $a^5$, diaphragms B, having notches $b$ in their upper section and passages $b'$ in their lower section, with internal pipes, C, also formed in longitudinal sections, affording conduits for conductors therein, substantially as shown and described.

2. In a system of electrical conductors, diaphragms B, having notches $b$ and openings $b'$ for the reception of conduits or cables, in combination with the external casing, A, having lugs $a^5$, said lugs being adapted to prevent the diaphragm B from turning in casing A, substantially as described.

3. In a system of electrical conductors, the combination, with the frangible conduits C, of elastic rings or clamps forming bearings for said conduits and moisture-excluders for their joints, substantially as shown and described.

4. In a system of electrical conductors, the combination of an external sectional casing with internal sectional conduits, said internal conduits being provided with curved connections, substantially as shown and described.

In testimony that I claim the foregoing I have hereunto set my hand this 19th day of May, 1881.

SAMUEL D. STROHM.

Witnesses:
H. D. DUBOIS,
S. J. VAN STAVOREN.